US010839607B2

United States Patent
Baumbach (10) Patent No.: US 10,839,607 B2
(45) Date of Patent: Nov. 17, 2020

(54) SYSTEMS AND METHODS TO PROVIDE VIEWS OF A VIRTUAL SPACE

(71) Applicant: Disney Enterprises, Inc., Burbank, CA (US)

(72) Inventor: Elliott Baumbach, Porter Ranch, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/241,791

(22) Filed: Jan. 7, 2019

(65) Prior Publication Data

US 2020/0219321 A1 Jul. 9, 2020

(51) Int. Cl.
*G06T 19/00* (2011.01)
*G02B 27/02* (2006.01)
*G02B 27/00* (2006.01)
*G06F 3/01* (2006.01)

(52) U.S. Cl.
CPC ........ *G06T 19/006* (2013.01); *G02B 27/0093* (2013.01); *G02B 27/022* (2013.01); *G06F 3/013* (2013.01)

(58) Field of Classification Search
None
See application file for complete search history.

(56) References Cited

U.S. PATENT DOCUMENTS

| 7,948,481 | B2 | 5/2011 | Vilcovsky |
| 8,872,854 | B1 | 10/2014 | Levitt |
| 9,092,061 | B2 | 7/2015 | Elmekies |
| 9,240,077 | B1 | 1/2016 | Kraft |
| 9,324,190 | B2 * | 4/2016 | Bell ......................... G06T 19/20 |
| 9,325,943 | B2 * | 4/2016 | Wilson ................... H04N 7/157 |
| 9,348,141 | B2 | 5/2016 | Bar-Zeev |
| 9,348,411 | B2 * | 5/2016 | Paek ........................ G09G 3/20 |
| 9,350,924 | B2 | 5/2016 | Posa |
| 9,904,055 | B2 | 2/2018 | Burns |
| 10,350,486 | B1 * | 7/2019 | Capper ................. G06F 1/1686 |

(Continued)

FOREIGN PATENT DOCUMENTS

WO 2017108699 6/2017

OTHER PUBLICATIONS

Hughes, Charles E., et al. "Augmenting museum experiences with mixed reality." Proceedings of KSCE 2004. 2004.*

(Continued)

*Primary Examiner* — Ryan M Gray
(74) *Attorney, Agent, or Firm* — Esplin & Associates, PC (57) ABSTRACT

Systems and methods configured to provide views of a virtual space are presented herein. A display device may include a display screen, one or more sensors, and/or other component. The one or more sensors being configured to generate output signals conveying gaze information including one or more of a viewpoint, a gaze direction, and/or other information. An instance of a virtual space may be executed to determine a view of the virtual space based on the gaze information and/or other information. The view of the virtual space may correspond to a field of view within the virtual space determined based on the gaze information. The instance of the virtual space may be presented on the display screen according to the determined view of the virtual space.

18 Claims, 6 Drawing Sheets

(56) References Cited

U.S. PATENT DOCUMENTS

| | | | |
|---|---|---|---|
| 2010/0110069 A1* | 5/2010 | Yuan | G06T 15/20 |
| | | | 345/419 |
| 2012/0038671 A1 | 2/2012 | Min | |
| 2012/0105473 A1 | 5/2012 | Bar-Zeev | |
| 2013/0145272 A1 | 6/2013 | Boggie | |
| 2013/0178257 A1 | 7/2013 | Langseth | |
| 2014/0354690 A1 | 12/2014 | Walters | |
| 2015/0016777 A1 | 1/2015 | Abovitz | |
| 2015/0113581 A1* | 4/2015 | McArdle | H04N 21/23412 |
| | | | 725/115 |
| 2015/0235370 A1 | 8/2015 | Abovitz | |
| 2015/0371447 A1* | 12/2015 | Yasutake | G06T 19/006 |
| | | | 345/420 |
| 2016/0026253 A1 | 1/2016 | Bradski | |
| 2016/0189334 A1 | 6/2016 | Mason | |
| 2016/0292535 A1 | 10/2016 | Thorn | |
| 2016/0300387 A1 | 10/2016 | Ziman | |
| 2016/0317930 A1* | 11/2016 | Nakayama | G06F 3/012 |
| 2017/0038829 A1* | 2/2017 | Lanier | G06F 3/04883 |
| 2017/0160815 A1 | 6/2017 | Glazier | |
| 2017/0169598 A1 | 6/2017 | York | |
| 2017/0169610 A1 | 6/2017 | King | |
| 2018/0059902 A1 | 3/2018 | Martin | |
| 2018/0096528 A1 | 4/2018 | Needham | |
| 2018/0101985 A1 | 4/2018 | Jones-Mcfadden | |
| 2018/0250589 A1* | 9/2018 | Cossairt | A63F 13/843 |
| 2018/0361260 A1 | 12/2018 | Ord | |
| 2018/0364799 A1 | 12/2018 | Ord | |
| 2019/0201806 A1* | 7/2019 | Weston | G06F 3/04883 |
| 2019/0251749 A1* | 8/2019 | Rhodes, Jr. | G02B 5/0808 |

OTHER PUBLICATIONS

Shaoib, Huma, et al., A Survey of Augmented Reality, Artificial Intelligence and Multidisciplinary (AIM) Research Lab, Research Gate, retrieved on Nov. 1, 2016, 10 pages.

Smith, David, This may be the most impressive use of Apple's new AR software yet, Business Insider (Jul. 11, 2017) retrieved from: http://www.businessinsider.com/apple-arkit-portal-video-2017-7.

Rukeja, Sumeet, Building AR Portal: A Door to Fascinating AR Experience, Yudiz (May 22, 2018) retrieved from: https://www.yudiz.com/building-ar-portal-a-door-to-fascinating-ar-experience/.

Advanced Micro Devices, Inc. (May 25, 2018), AMD Technology Enabling ARwall's Real-Time Virtual Set Extension Tools [Video file], Retrieved from https://www.youtube.com/watch?v=cC7iPZatS1E.

Smith, David, This may be the most impressive use of Apple's new AR software yet, Business Insider (Jul. 11, 2017) retrieved from: http://www.businessinsider.com/apple-arkit-portal-video-2017-7. (1 page).

Rukeja, Sumeet, Building AR Portal: A Door to Fascinating AR Experience, Yudiz (May 22, 2018) retrieved from: https://www.yudiz.com/building-ar-portal-a-door-to-fascinating-ar-experience/. (6 pages).

Advanced Micro Devices, Inc. (May 25, 2018), AMD Technology Enabling ARwall's Real-Time Virtual Set Extension Tools [Video file], Retrieved from https://www.youtube.com/watch?v=cC7iPZatS1E (3 pages).

* cited by examiner

SYSTEMS AND METHODS TO PROVIDE VIEWS OF A VIRTUAL SPACE

FIELD

This disclosure relates to systems and methods to provide views of a virtual space.

BACKGROUND

Science fiction has imagined the idea of a window or portal into another world or into another dimension.

SUMMARY

One aspect of the disclosure relates to a system configured to provide views of a virtual space. The virtual space may comprise a simulated space and/or a representation a real-world space. The system may include one or more of one or more display devices, one or more physical processors, and/or other components.

A display device may include one or more of a display screen, one or more sensors, and/or other components. The one or more sensors may be configured to generate output signals conveying gaze information and/or other information. The gaze information may include one or more of a viewpoint of a user, a gaze direction of the user, and/or other information.

The one or more physical processors may be configured by machine-readable instructions. Executing the machine-readable instructions may cause the one or more physical processor to facilitate providing views of a virtual space. The machine-readable instructions may include one or more computer program components. The computer program components may include one or more of a gaze component, a space component, a presentation component, and/or other components.

The gaze component may be configured to obtain the output signals from the one or more sensors and/or determine the gaze information from the output signals.

The space component may be configured to obtain space information and/or other information. The space information may define a virtual space. The virtual space may include a simulated space and/or a representation of a location in a real-world space. The space component may be configured to execute an instance of a virtual space and/or determine a view of the virtual space based on the gaze information and/or other information. The virtual space may include a topography and/or one or more virtual objects positioned within the topography that are capable of locomotion within the topography. The view of the virtual space may correspond to a field of view within the virtual space. The field of view within the virtual space may be determined based on one or more of the gaze direction, viewpoint, and/or other gaze information of the user and/or other information.

The presentation component may be configured to effectuate, via the display screen, presentation of the instance of the virtual space according to the determined view of the virtual space.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
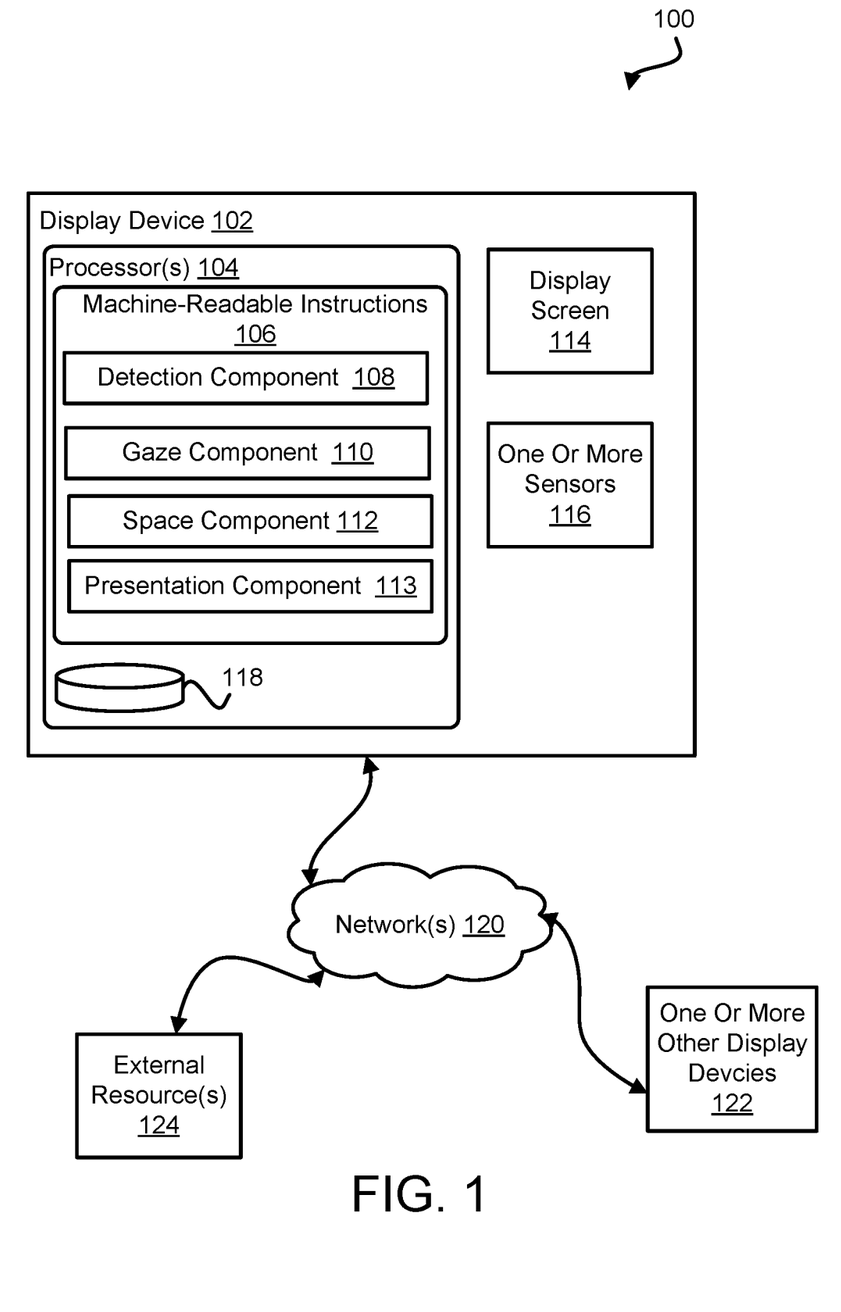
FIG. 1 illustrates a system configured to provide views of a virtual space, in accordance with one or more implementations.

FIG. 1 illustrates a system 100 configured to provide views of a virtual space, in accordance with one or more implementations. The virtual space may comprise a simulated space and/or a representation of a real-world space. Views of the virtual space may be determined based on one or more of a gaze direction of a user, viewpoint of the user, and/or other information. The views of the virtual space may be presented on a display device. In this sense, the display device may act as a window or portal to view into the virtual space the user gazes at the display device.

The system 100 may include one or more of display device 102, one or more other display devices 122, and/or other components. The display device 102 may include one or more of one or more physical processors 104, non-transitory electronic storage 118, a display screen 114, one or more sensors 116, and/or other components. The non-transitory electronic storage 118 may be configured to store information utilized by display device 102 and/or other components of system 100.

In some implementations, although the one or more physical processors 104 are shown as being included with display device 102, this is for illustrative purposes only. In other implementations, the one or more physical processors 104 may be remotely located from display device 104 and provide features and/or functionality of machine-readable instructions 106 to display device 102 remotely. By way of non-limiting illustration, the display device 102 may communicate with one or more physical processors 104 via client/server architecture, and/or other communication schemes. Further, it is noted that other ones of the one or more other display devices 122 may include the same and/or similar features and/or functionality as display device 102. For example, individual display devices of one or more other display devices 122 may include machine-readable instructions that may be the same or similar to machine-readable instructions 106 of one or more physical processors 104. Further in some implementations, individual ones of the display devices may communicate with other ones of the display devices to facilitate the exchange of information.

Display device 102 may comprise a standalone physical object. In some implementations, the display device 102 may include one or more of a mount (not shown in FIG. 1) for securing the display device 102 to a surface, one or more adjustment components (not shown) to facilitate physical manipulation of the display device 102, and/or other components. The mount may be rotatable and/or extendable via the one or more adjustment components. The one or more adjustment components may include one or more handles. The mount may fix the display device 102 at a base position and establish a normal direction of the display device 102 relative to a surface on which it may be fixed at the base position. A position of the display screen may be adjusted relative to the base position. A direction of the display screen may be adjusted relative to the established normal direction of the display device. By way of non-limiting illustration, a user may engage the handles and rotate and/or extend the mount to change a pointing direction and/or height of the display screen 114 of the display device 102.

The display screen 114 may be configured to present visual content. The visual content may be in the form of images, video, text, and/or other content. The visual content may include views of a virtual space (see, e.g., space component 112). The display screen 114 may comprise a liquid crystal display (LCD) and/or other display.

Individual sensors of one or more sensors 116 may be configured to generate output signals. The one or more sensors 116 may include one or more of an orientation sensor, a location sensor, one or more gaze tracking devices, a reader, and/or other sensors.

In some implementations, a gaze tracking device may be configured to generate output signals conveying gaze information. The gaze information may include one or more of a viewpoint of a user, a gaze direction of a user, a gaze position, and/or other information. The viewpoint may be specified as a position of the user's head and/or face relative the display device 102 and/or a surface of the display screen 114. The gaze position may be specified as a convergence point in space. The gaze direction may be specified as a vector having an origin at the viewpoint and extending toward the gaze position. In some implementations, a gaze tracking device may include one or more of one or more sensors, one or more emitters, and/or other components.

An emitter may be configured to emit light. The emitter may comprise an infrared (IR) emitter configured to emit IR light. In some implementations, a sensor may comprise one or more of an IR sensor, an image sensor, and/or other sensors. A sensor of a gaze tracking device may comprise an IR camera and/or other devices. In some implementations, output signals of one or more sensors of a gaze tracking device may convey one or more of positions of one or more pupils of a user relative to a locus of a reflectance of light emitted by an emitter of the gaze tracking device, and/or other information. Output signals of one or more sensors of a gaze tracking device may be used to determine gaze information and/or other information.

An image sensor may be configured to generate output signals conveying image information. The image information may define visual content in the form of one or more images. Images may be defined by pixels and/or other information. Pixels may be characterized by one or more of pixel location, pixel color, pixel transparency, and/or other information. The image information may facilitate determination of gaze information and/or other information. One or more image-based techniques may be utilized to determination of gaze information from images. By way of non-limiting illustration, techniques may include one or more of computer vision, Speeded Up Robust Features (SURF), Scale-invariant Feature Transform (SIFT), Oriented FAST and rotated BRIEF (ORB), Optical Character Recognition (OCR), facial recognition, and/or other techniques.

In some implementations, an orientation sensor of one or more sensors 116 may be configured to generate output signals conveying orientation information and/or other information. Orientation information derived from output signals of an orientation sensor may define an orientation of the display device 102. In some implementations, orientation may refer to one or more of a pitch angle, a roll angle, a yaw angle, heading, pointing direction, and/or other measurements. In some implementations, the measurements may be specified with respect to the normal direction of the display device 102 relative to a surface on which it may be fixed at the base position. An orientation sensor may include an inertial measurement unit (IMU) such as one or more of an accelerometer, a gyroscope, a magnetometer, Inclinometers, Electronic nose, Infrared Imagers, Micro-bolometers, micro-displays (DMD), Digital micro-mirror device, Optical Switches, and/or other devices.

In some implementations, a location sensor of one or more sensors 116 may be configured to generate output signals conveying location information and/or other information. Location information derived from output signals of a location sensor may define one or more of a geo-location of the display device 102, an elevation of the display device 102, and/or other measurements. A location sensor may include one or more of a GPS, an altimeter, a pressure sensor, and/or other devices.

In some implementations, a reader may be configured to obtain signals from physical objects and/or provide signals associated with individual physical objects to one or more physical processors 104. In some implementations, obtaining a signal from a physical object may convey a detection of the physical object and/or a user associated with the physical object. A given signal from a physical object may convey information including one or more one or more of object identification information, user identification information, experience information, and/or other information stored by and/or associated with the physical object. In some implementations, a reader may be a peripheral device configured to be communicatively coupled with display device 102. In some implementations, a reader may include RFID components configured to communicate with RFID components (one or more radio frequency communication components) and/or other components.

In some implementations, a physical object may depict and/or may have a form factor that physically embodies an appearance of an entity and/or may have other form factors. The entity may be a virtual entity such as one or more of a game entity, a movie entity, and/or other entities. The entity may be a fantastical entity, such as a fictional character in a movie portrayed by a real person. Examples of form factors may include one or more of a toy figurine, a toy accessory, a worn object (such as a wrist band), and/or other form factors. A physical object may be an RFID enabled device including one or more of one or more radio frequency communication components, non-transitory electronic storage, and/or other components. The one or more radio frequency communication components may be configured to facilitate communication with a reader. The non-transitory electronic storage may be configured to store information.

In some implementations, user identification information may include information that identifies individual users. The user identification information may include one or more of a name, a username, a handle, subscription information, and/or other information.

The object identification information may include information that identifies individual physical objects. The object identification information may include one or more of a name, a serial number, and/or other information. A serial number may be unique to an individual physical object. That is, even if two different physical object depict the same entity (such that they appear as identical), the different products may have different and unique serial numbers to distinguish between them.

The experience information for a given user may be specific to the user. The experience information may specify products interacted with by the user. This may include products owned by the users, products experienced by the users, and/or other products. Interactions may include one or more of playing, visiting, sharing, viewing, and/or other forms of interaction. In some implementations, an individual product may include a good and/or a service. An individual good may include a physical object. An individual good may include one or more of a toy, a game console, a book, an article of clothing, and/or other physical object. An individual service may include an experience of a user which may or may not require interaction with one or more products. An individual service may include one or more of an online video game, an attraction at a theme park, a movie viewing experience, and/or other services.

In some implementations, the one or more sensors 116 may include a first set of one or more sensors and a second set of one or more sensors. The first set of one or more sensors may be disposed on a first side of the display device 102 where display screen 114 is shown and/or facing. The second set of one or more sensors may be disposed on a second side of the display device 102. The second side may be opposite the first side and face an opposite direction than the display screen 114.

In some implementations, the first set of one or more sensors may include sensors configured to generate output signals conveying one or more of gaze information, detection of physical object(s) and/or user(s), and/or other information.

In some implementations, the second set of one or more sensors may include sensors configured to generate output signals conveying image information, detection of physical object(s) and/or user(s), determination of location of user(s), and/or other information. The image information conveyed by the output signals of the second set of one or more sensors may be used to detect presence of one or more users within an environment within a field of view of the second set of one or more sensors, and/or determine location of the one or more users within the environment within the field of view of the second set of one or more sensors (see, e.g., detection component 108).

Figure 3:
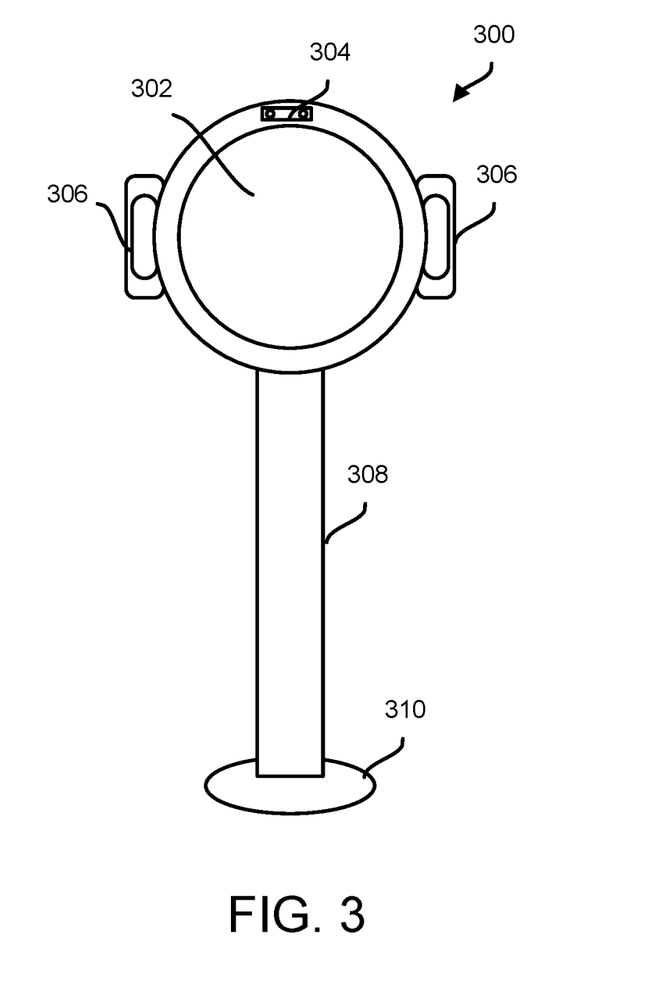
FIG. 3 illustrates a display device, in accordance with one or more implementations.

FIG. 3 illustrates a display device 300, in accordance with one or more implementations. The display device 300 may include one or more of a display screen 302, a first set of sensors 304, a second set of sensors (not shown in FIG. 3) opposite the first set of sensors 304, a set of handles 306, a mount 308, a base 310, and/or other components.

Returning to FIG. 1, the one or more physical processors 104 may be configured by machine-readable instructions 106. Executing machine-readable instructions 106 may cause one or more physical processors 104 to facilitate user interactions with virtual objects depicted as being present in a real-world space. The machine-readable instructions 106 may include one or more computer program components. The one or more computer program components may include one or more of a detection component 108, a gaze component 110, a space component 112, a presentation component 113, and/or other components.

The detection component 108 may be configured to obtain orientation information derived from output signals generated by one or more orientation sensors of one or more sensors 116. By way of non-limiting illustration, orientation information for a display device 102 may define orientation of the display device 102 over one or more points in time. In some implementations, output signals generated by one or more orientation sensors may be sampled in real-time, near real-time, at specified intervals, and/or at other points in time. In some implementations, the orientation of the display device 102 may dictate the view of the virtual space presented on the display screen 114 (see, e.g., space component 112).

The detection component 108 may be configured to detect, based on image information derived from output signals from the second set of one or more sensors, presence of one or more users within a field of view of the second set of one or more sensors. The detection component 108 may be configured to determine location of the one or more users present within the field of view of the second set of one or more sensors. The one or more users present within the field of view of the second set of one or more sensors may represent user(s) physically present and behind display device 102. Behind the display device 102 may refer to a direction opposite of the facing direction of the display screen 114. In some implementations, the one or more users behind display device 102 may cause one or more customizations within the virtual space presented on the display screen 114 (see, e.g., space component 112).

The detection component 108 may be configured to detect, based on image information derived from output signals from the first set of one or more sensors, presence of one or more users within a field of view of the first set of one or more sensors. The one or more users present within the field of view of the first set of one or more sensors may represent user(s) physically present and in front of display device 102. In front of the display device 102 may refer to a location where a user may be gazing into the display screen 114.

The detection component 108 may be configured to detect presence of one or more physical objects associated with one or more users. An individual physical object may include non-transitory electronic storage storing information and/or other components. The information may facilitate identifying the user and/or the physical object. In some implementations, the detection component 108 may be configured to obtain experience information specific to individual users detected and identified. In some implementations, experience information may cause one or more customizations within the virtual space presented on the display screen 114 (see, e.g., space component 112).

The gaze component 110 may be configured to determine gaze information from the output signals or one or more sensors 116 of display device 102. The gaze information may be determined for individual users detected as being present in front of, e.g., gazing into, the display screen 114. In some implementations, gaze information may dictate the view of the virtual space presented on the display screen 114 (see, e.g., space component 112).

The space component 112 may be configured to obtain space information and/or other information. The space information may define a virtual space. The virtual space may be a simulated space and/or a representation of a location in a real-world space.

In some implementations, a simulated space may have a topography, express ongoing real-time interaction by one or more users, and/or include one or more virtual objects positioned within the topography that are capable of locomotion within the topography. In some instances, the topography may be a 2-dimensional topography. In some instances, the topography may be a 3-dimensional topography. The topography may include dimensions of the space and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). An instance executed by the computer components may be synchronous, asynchronous, and/or semi-synchronous. In some implementations, the simulated space may be a fantastical space, a realistic space, and/or other types of simulated space.

Within the instance(s) of the virtual space executed by space component 112, users may control entities (e.g., game entities for gameplay), simulated physical phenomena (e.g., wind, rain, earthquakes, and/or other phenomena), and/or other elements within the virtual space to interact with the virtual space, other virtual objects, and/or other users. The game entities may include virtual characters such as avatars. The game entities may include virtual representations of the products. As used herein, the term game entity may refer to a virtual object present in the virtual space that represents an individual user. A game entity may be controlled by the user with which it is associated. The user-controlled element(s) may move through and interact with the virtual space (e.g., non-user characters in the virtual space and/or other objects in the virtual space). The user-controlled elements controlled by and/or associated with a given user may be created and/or customized by the given user. The user may have an "inventory" of virtual items and/or currency that the user can use (e.g., by manipulation of a game entity or other user-controlled element, and/or other items) within the virtual space.

Control by users may be exercised through control inputs and/or commands input by the users through one or more input techniques, such as a controller (not shown in FIG. 1), voice-based inputs, gesture-based inputs, and/or other inputs. The users may interact with each other through communications exchanged within the virtual space. Such communications may include one or more of textual chat, instant messages, private messages, voice communications, and/or other communications. Communications may be received and entered by the users. Communications may be routed to and from the appropriate users through one or more physical processors 104 and/or through communications which are external to the system 100 (e.g., text messaging services).

The instance of the virtual space may be persistent. That is, the virtual space may continue on whether or not individual user are currently logged in and/or participating in the virtual space. A user who logs out of the virtual space and then logs back in some time later may find the virtual space has been changed through the interactions of other users with the virtual space during the time the user was logged out. These changes may include changes to the simulated physical space, changes in the user's inventory, changes in other users' inventories, changes experienced by non-player characters, changes to the virtual items available for use in the virtual space, changes based on ongoing changes to usage information, and/or other changes.

In some implementations, the space information may define one or more representations of one or more locations within a real-world space. An individual location in the real-world space may include one or more of one or more real-world objects, one or more people, and/or other entities present in and/or moving through the real-world space.

In some implementations, a representation of a location in a real-world space may include a three-dimensional digital model of the real-world space. In some implementations, a digital model may represent the real-world space virtually (e.g., as a virtual space). In some implementations, a digital model may represent the real-world space realistically (e.g., real-world virtual reality). One or more computer modeling techniques for creating a 3D digital model of a location by using depth maps may be used. Depth maps may be created using depth sensors, stereo cameras, and/or other devices. In some implementations, semiautomatic techniques may be used that may differentiate between foreground, background, and/or intermediate levels. Lighting of a 3D model may change depending on an hour, date, and/or climate forecast (e.g., rain may be simulated).

A three-dimensional model of the real-world space may be defined by one or more of appearance information, spatial information, and/or other information.

Appearance information defining at least part of a model of a location in the real-world space may include information defining one or more images of the location. Information defining one or more images of the location may be derived from output signals of one or more image sensors. The one or more image sensors may be placed at a reference point within the location. In some implementations, information conveyed from output signals of one or more image sensors may represent the location in the real-world space within a field of view of the one or more image sensor with respect to a reference point the one or more image sensors may be placed. In some implementations, information conveyed from output signals of an image sensor may define one or more of an image, an image sequence, a video, and/or other representations of the real-world space. An image may be defined by a set of pixels and/or other information. Individual pixels in the set of pixels may be defined by one or more of a pixel location, a pixel color, and/or other specifications. A pixel location may include a location on an image plane. Pixel color may be defined by chromaticity of colors specified within a color space, such as an RGB color space. An image sensor may include one or more of a charge-coupled device sensor, an active pixel sensor, a complementary metal-oxide semiconductor sensor, an N-type metal-oxide-semiconductor sensor, and/or other devices.

In some implementations, spatial information may model physical dimensions of a location in the real-world space. Spatial information may include a depth map of the location and/or other information. A depth map may be generated by one or more depth cameras and/or other devices. The one or more depth cameras may be placed at a reference point within the location. The reference point of the one or more depth cameras may be the same as or similar to a reference point where one or more image sensors may be placed. Depth cameras may be configured to generate real-time depth maps of a real-world space. A depth map may include a set of points (also known as a point cloud). Individual points in a depth map may correspond to individual discrete range measurements from the reference point as captured by the depth camera to a surface lying in the real-world. A depth camera may include one or more of a laser range scanner, a time-of-flight camera, an illumination unit, an image sensor, driver electronics, computation/Interface RF-modulated light sources with phase detectors, and/or other devices.

In some implementations, appearance information and spatial information may be combined to generate a model. For example, real-world objects, people, surfaces, and/or other content depicted in one or more images of the real-world space may be mapped to corresponding locations specified by the spatial information in order to realistically model both the visual appearance and the physical dimensions of the physical space. By way of non-limiting illustration, a model of a location of a real-world space may comprise a real-world virtual reality model providing 360 degree views of the location.

In some implementations, space component 112 may be configured to obtain space information defining a representation of a real-world space at a closed location in the real-world space. A closed location may include a building interior (e.g., a room, a hallway, and/or other closed interior space of a building), and/or other locations.

In some implementations, space information defining a representation of a location in a real-world space may further define one or more virtual objects depicted as being present in the location. Individual virtual objects may be configured to experience locomotion within a representation of a location. For example, a virtual object may be depicted as being present in and/or moving through the location.

In some implementations, virtual objects may having one or more visual depictions. By way of non-limiting illustration, a virtual object may depict one or more of a real-world entity (e.g., humans and/or animals), a fantastical entity (e.g., one or more of monsters, aliens, animated movie/TV characters, and/or other entities), a real-world object (e.g., furniture), a shape (e.g., a star-shape), a user (e.g., an avatar), and/or other entities and/or objects.

In some implementations, spatial information used to generate a representation of a location of real-world space (e.g., three-dimensional model) may allow for one or more virtual objects depicted in the representation of the location to be at least partially occluded by one or more real-world objects and/or persons present in and/or moving through the real-world space. By way of non-limiting illustration, spatial information may provide knowledge of the physical dimensions of the location such that virtual objects may be depicted as moving through the location much like a real-world object and/or person physically present at the location. Virtual objects may be placed at and/or may translate to (e.g., experience locomotion) one or more locations behind (e.g., occluded by) and/or in front of real-world objects and/or persons present at the location.

In some implementations, space component 112 may be configured to execute an instance of a virtual space and implement the instance of the virtual space to determine state of the virtual space. The state may then be communicated (e.g., via streaming visual data, object/position data, and/or other state information) from one or more physical processors 104 to display screen 114 for presentation to users. The state determined and presented may correspond to a location in the virtual space, a view of the virtual space, and/or other information. The view described by the state may correspond, for example, to the location from which the view is taken, the location the view depicts, a zoom ratio, a dimensionality of objects, a point-of-view, a field of view within the virtual space, and/or parameters.

The above description of the manner in which the state of the virtual space is determined by space component 112 is not intended to be limiting. The space component 112 may be configured to express the virtual space in a more limited, or richer, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. Other expressions of individual places within the virtual space are contemplated.

In some implementations, a field of view describing a view of a virtual space may be determined based on one or more of gaze information, orientation information, and/or other information. The field of view may include a portion of the virtual space that falls within the field of view.

In some implementations, a field of view describing a view of a virtual space may be determined based on gaze information. By way of non-limiting illustration, one or more of the viewpoint, the gaze direction, and/or the gaze position of a user in the real-world may be translated to a virtual viewpoint, gaze direction, and/or gaze position in the virtual space to generate a field of view in the virtual space that corresponds to the virtual viewpoint, gaze direction, and/or gaze position. As the gaze information of the user in the real-world changes, the field of view (dictated by the virtual viewpoint, gaze direction, and/or gaze position in the virtual space) may also change. During the change in the gaze information, objects positioned within the virtual space may exhibit the parallax effect as the field of view changes. This may give the user the experience of viewing through a window as opposed to a flat, two dimensional screen.

One or more of the virtual viewpoint, gaze direction, and/or gaze position in the virtual space may be made to match, and/or substantially match, one or more of the viewpoint, the gaze direction, and/or the gaze position of the user in the real-world. In some implementations, the "match" may refer to a one-to-one match such that the field of view changes according to the changes of the users gaze and real-world physics. By way of non-limiting illustration, if a user's gaze direction changes by 5 degrees (or other amount), then the field of view may also change by 5 degrees (or other amount). In some implementations, the "match" may refer to a one-to-many match such that the field of view changes according to the changes of the users gaze and a multiple. By way of non-limiting illustration, if a user's gaze direction changes by 5 degrees (or other amount), then the field of view may change by 20 degrees (e.g., 4×, and/or other multiple).

In some implementations, the space component 112 may be configured to determine a field of view describing a view within virtual space based on an orientation of display device 102. The orientation of the display device 102 may be used to determine a corresponding orientation within virtual space (e.g., the three-dimensional model of a location and/or a simulated space). The corresponding orientation within the virtual space may determine the field of view within the virtual space.

In some implementations, the corresponding orientation within the virtual space may be determined with respect to a reference point in the virtual space. In some implementations, the reference point may include, for example, a point where one or more devices (e.g., image sensors, depth sensors, and/or other devices) may have been placed in the location in the real-world space when collecting information (e.g., appearance information and/or spatial information) to generate a model. In some implementations, the reference point may include, for example, a point within the topography of a simulated space. The point acting a reference point may be predetermined, selected by a user, arbitrarily determined, and/or determined in other ways.

As changes in orientation of the display device 102 may be made by a user, the field of view describing views of the virtual space may be changed. The display device 102 may act as a movable window into the virtual space.

In some implementations, the space component 112 may be configured to customize the virtual space based on one or more of user(s) detected as being present behind the display device 102, experience information corresponding to the user(s) detected as being present behind the display device 102, experience information corresponding to the user(s) viewing the display screen 114, and/or other information.

In some implementations, customizing the virtual space based on one or more of user(s) detected as being present behind the display device 102 may include one or more of determining location of the one or more users present behind the display device 102, introducing one or more virtual objects within the topography of the virtual space, and/or other operations. In some implementations, individual virtual objects introduced into the topography of the virtual space may have individual perceived locations within the virtual space that correspond to individual locations of individual users. In the individual virtual objects may include virtual entities, such as characters. In this sense, a user walking behind the display device 102 may appear to the user viewing the display screen 114 as "walking" into the virtual space and appearing as a virtual character.

In some implementations, customizing the virtual space based on experience information corresponding to the user(s) detected as being present behind the display device 102 may include causing the virtual object(s) introduced into the virtual space to appear as an entity representative of the user(s). By way of non-limiting illustration, the virtual character appearing to "walk" into the virtual space may be a game entity (such as an avatar) played by a detected user.

In some implementations, customizing the virtual space based on experience information corresponding to the user(s) viewing the display screen 114 may include one or more of adding content to the virtual space, removing content from the virtual space, modifying content within the virtual space, and/or other customizations. In some implementations, the customization(s) may be specific to the experience information. In some implementations, content may be specific to experience information by virtue of the content being representative of experience information. In some implementations, the content may be representative of the experience information based on the content including one or both of visual depictions of information included in the experience information and/or audio characteristics of the information included in the experience information. By way of non-limiting illustration, experience information may specify a score achieved on a video game. A virtual space may be customized by adding in content, such as text, that depicts the score achieved. A virtual space may be customized by adding in content, such as a virtual character, that depicts a game entity used to achieve the score. Other customizations are contemplated.

In some implementations, presentation component 113 may be configured to effectuate, via display screen 114, presentation of the instance of the virtual space according to the determined view of the virtual space and/or one or more customizations.

Figure 4:
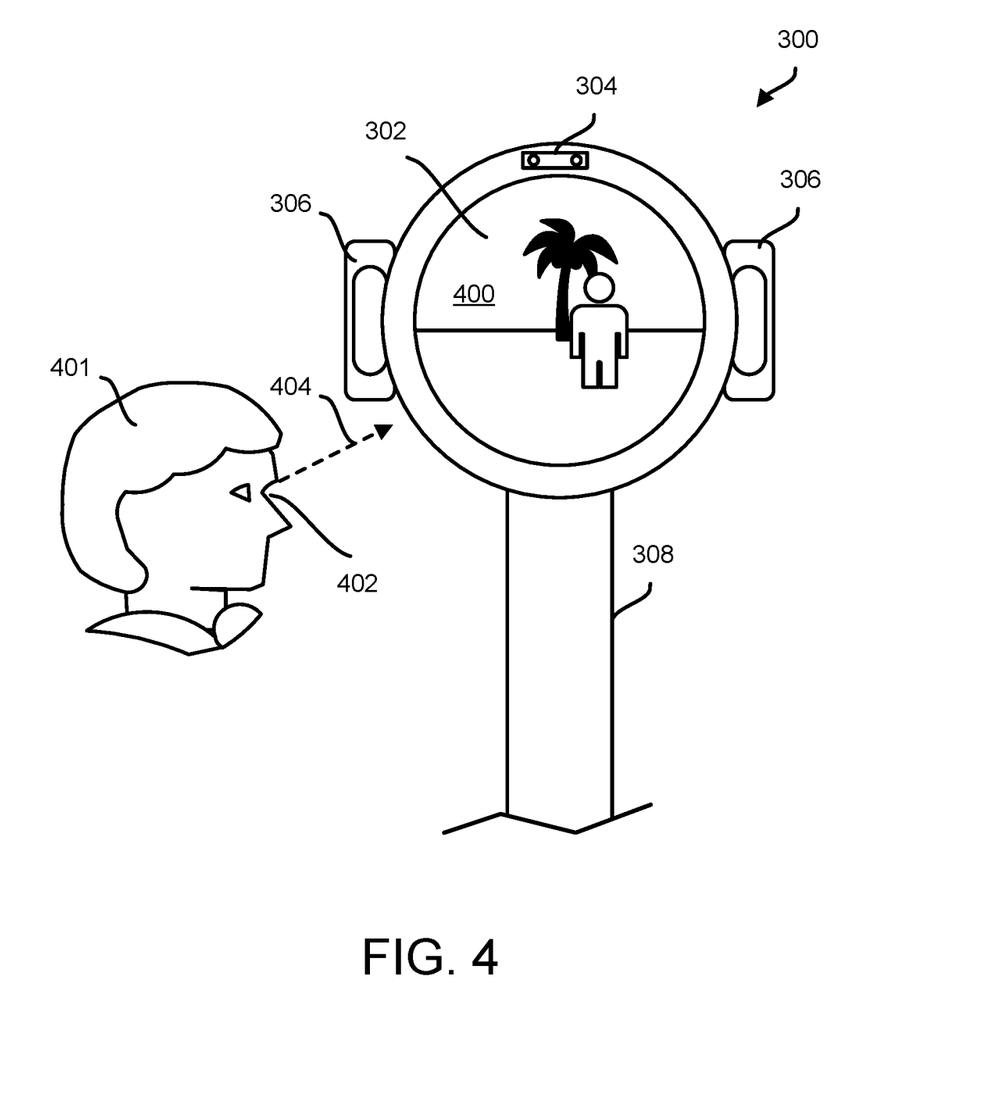
FIG. 4 illustrates a display device presenting views of a virtual space.
Figure 5:
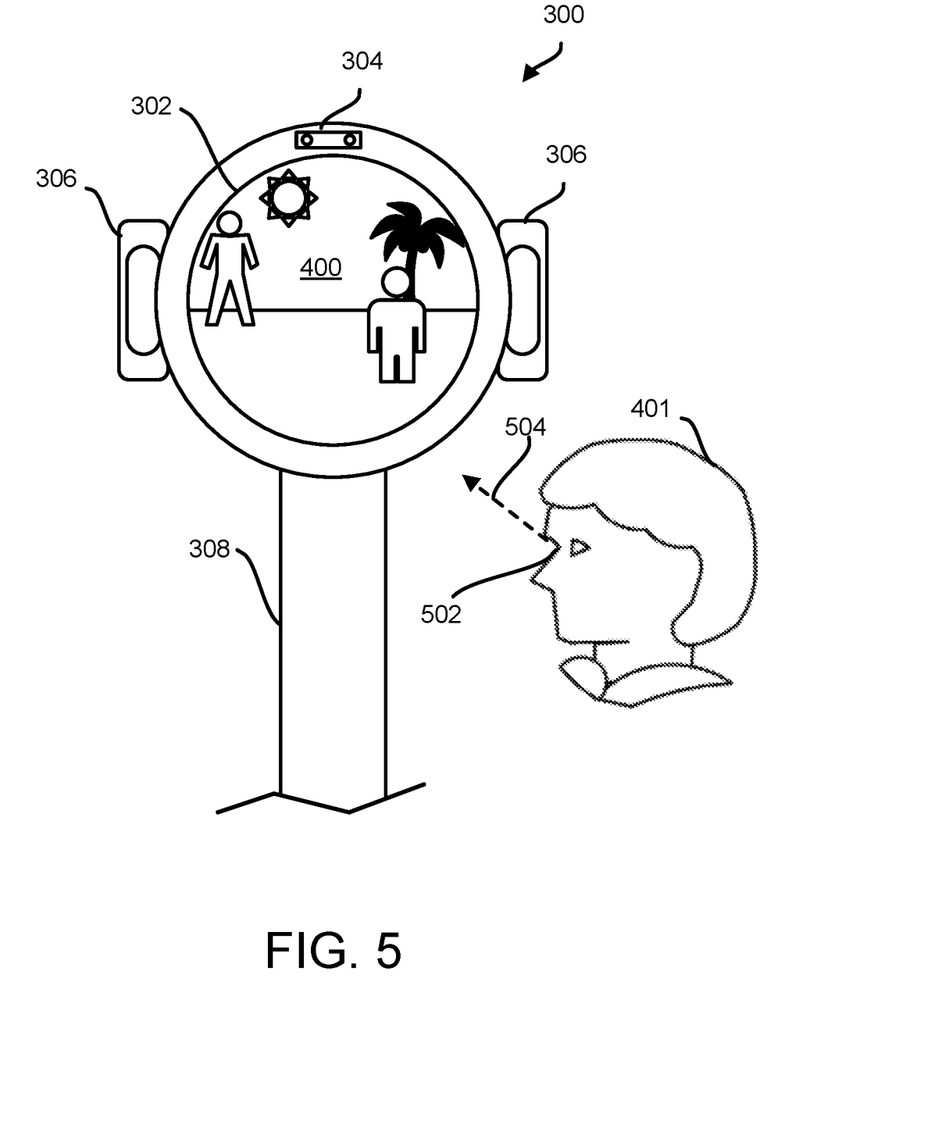
FIG. 5 illustrates a display device presenting views of a virtual space.
Figure 6:
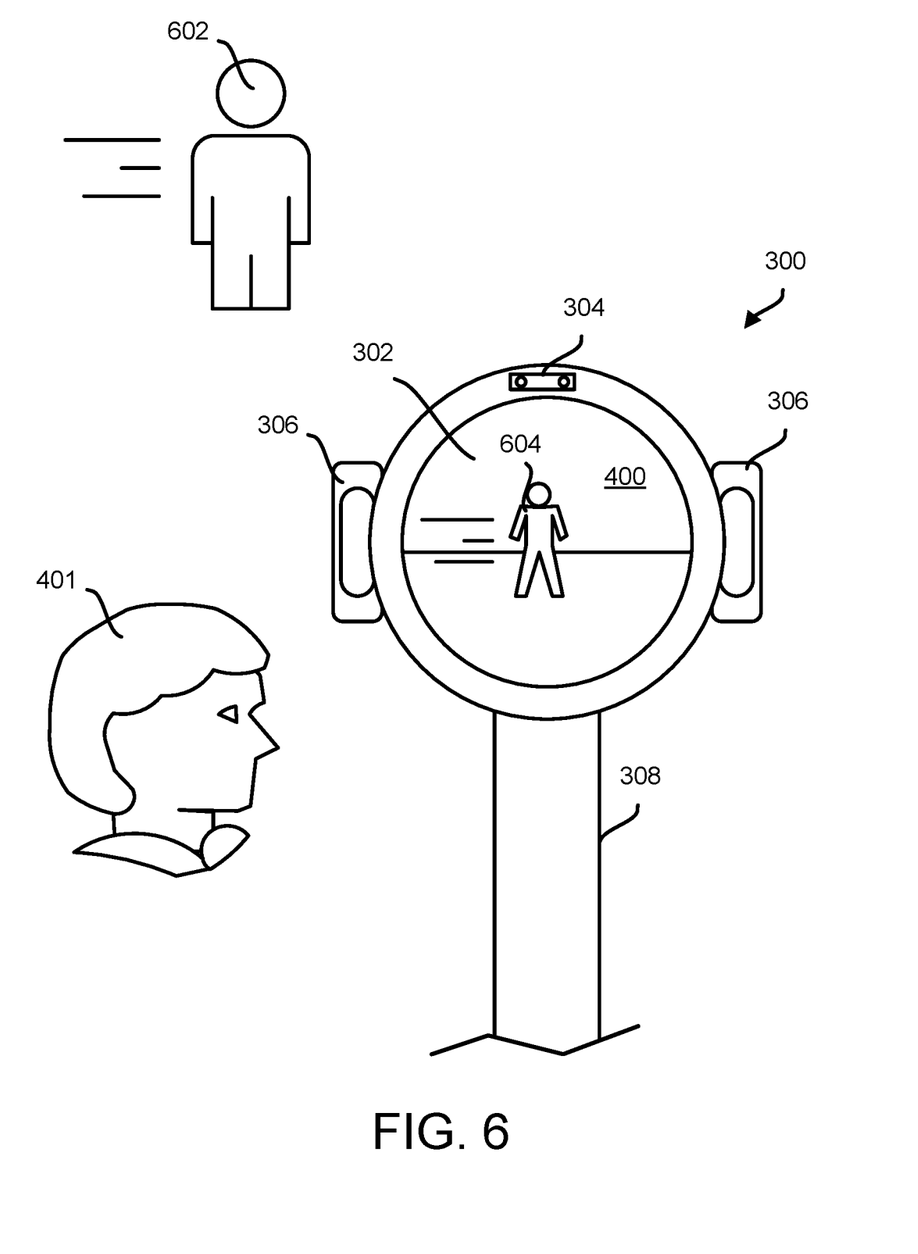
FIG. 6 illustrates a display device presenting views of a virtual space.

FIGS. 4-6 show various implementations of the system 100 of FIG. 1 with display device 300 presenting views of a virtual space 400.

In FIG. 4, a user 401 may be viewing the display screen 302. The user 401 may be associated with gaze information including one or more of a viewpoint 402, a gaze direction 404, and/or other gaze information. The view of the virtual space 400 may be determined based on the gaze information. By way of non-limiting illustration, a field of view may dictated the view of the virtual space 400 and may include a portion of the virtual space 400 that falls within the field of view. The portion of the virtual space may include one or more virtual object and/or other content.

FIG. 5 illustrates display device 300 presenting views of the virtual space 400 where the gaze information has changed (relative FIG. 4). The field of view of the virtual space 400 may change accordingly. By way of non-limiting illustration, the portion of the virtual space 400 that falls within the changed field of view may include one or more of additional virtual content that may fall within the field of, exhibition of parallax effect by virtual objects, and/or other changes.

FIG. 6 illustrates display device 300 presenting views of the virtual space 400 based on detection of a second user 602 detected as being present behind the display device 300. As illustrated, the detected second user 602 may cause a virtual object 604, such as an avatar, to appear within the virtual space 400. The location of the second user 602 may be determined and/or tracked. The virtual object 604 may be presented to have the same perceived location and/or movement as the second user 602.

Returning to FIG. 1, display device 102, one or more other display devices 122, external resources 124, one or more physical processor 104, and/or other components may be operatively linked via one or more electronic communication links. For example, such electronic communication links may be established, at least in part, via one or more networks 120. One or more networks 120 may include the Internet and/or other networks. It will be appreciated that this is not intended to be limiting and that the scope of this disclosure includes implementations in which components of system 100 may be operatively linked via some other communication media (e.g., wired and/or wireless).

External resources 124 may include sources of information, hosts, and/or providers of information outside of system 100, external entities participating with system 100, and/or other resources. In some implementations, some or all of the functionality attributed herein to external resources 124 may be provided by resources included in system 100.

Processor(s) 104 may include communication lines or ports to enable the exchange of information with a network and/or components of system 100. Illustration of processor(s) 104 in FIG. 1 is not intended to be limiting. Processor(s) 104 may include a plurality of hardware, software, and/or firmware components operating together to provide the functionality attributed herein to processor(s) 104. For example, processor(s) 104 may be implemented by a cloud of computing platforms operating together as processor(s) 104.

Electronic storage 118 may include electronic storage media that electronically stores information. The electronic storage media of electronic storage 118 may include one or both of system storage that is provided integrally (i.e., substantially non-removable) with processor(s) 104 and/or removable storage that is removably connectable to processor(s) 104 via, for example, a port or a drive. A port may include a USB port, a firewire port, and/or other port. A drive may include a disk drive and/or other drive. Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 118 may include one or more virtual storage resources (e.g., cloud storage, a virtual private network, and/or other virtual storage resources). Electronic storage 118 may store software algorithms, information determined by processor(s) 104, and/or other information that enables system 100 to function as described herein.

Processor(s) 104 may be configured to provide information-processing capabilities in display device 102. As such, processor(s) 104 may include one or more of a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. The processor(s) 104 may be configured to execute components 108, 110, 112, and/or 113. Processor(s) 104 may be configured to execute components 108, 110, 112, and/or 113 by software; hardware; firmware; some combination of software, hardware, and/or firmware; and/or other mechanisms for configuring processing capabilities on processor(s) 104.

It should be appreciated that although components 108, 110, 112, and/or 113 are illustrated in FIG. 1 as being co-located within a single processing unit, in implementations in which processor(s) 104 includes multiple processing units, one or more of components 108, 110, 112, and/or 113 may be located remotely from the other components. While computer program components are described herein as being implemented via processor(s) 104 through machine readable instructions 106, this is merely for ease of reference and is not meant to be limiting. In some implementations, one or more functions of computer program components described herein may be implemented via hardware (e.g., dedicated chip, field-programmable gate array). One or more functions of computer program components described herein may be one or more of software-implemented, hardware-implemented, and/or software and hardware-implemented. The description of the functionality provided by the different components 108, 110, 112, and/or 113 described above is for illustrative purposes and is not intended to be limiting, as any of components 108, 110, 112, and/or 113 may provide more or less functionality than is described. For example, one or more of components 108, 110, 112, and/or 113 may be eliminated, and some or all of its functionality may be provided by other ones of components 108, 110, 112, and/or 113 and/or other components. As another example, processor(s) 104 may be configured to execute one or more additional components that may perform some or all of the functionality attributed to one of components 108, 110, 112, and/or 113.

Figure 2:
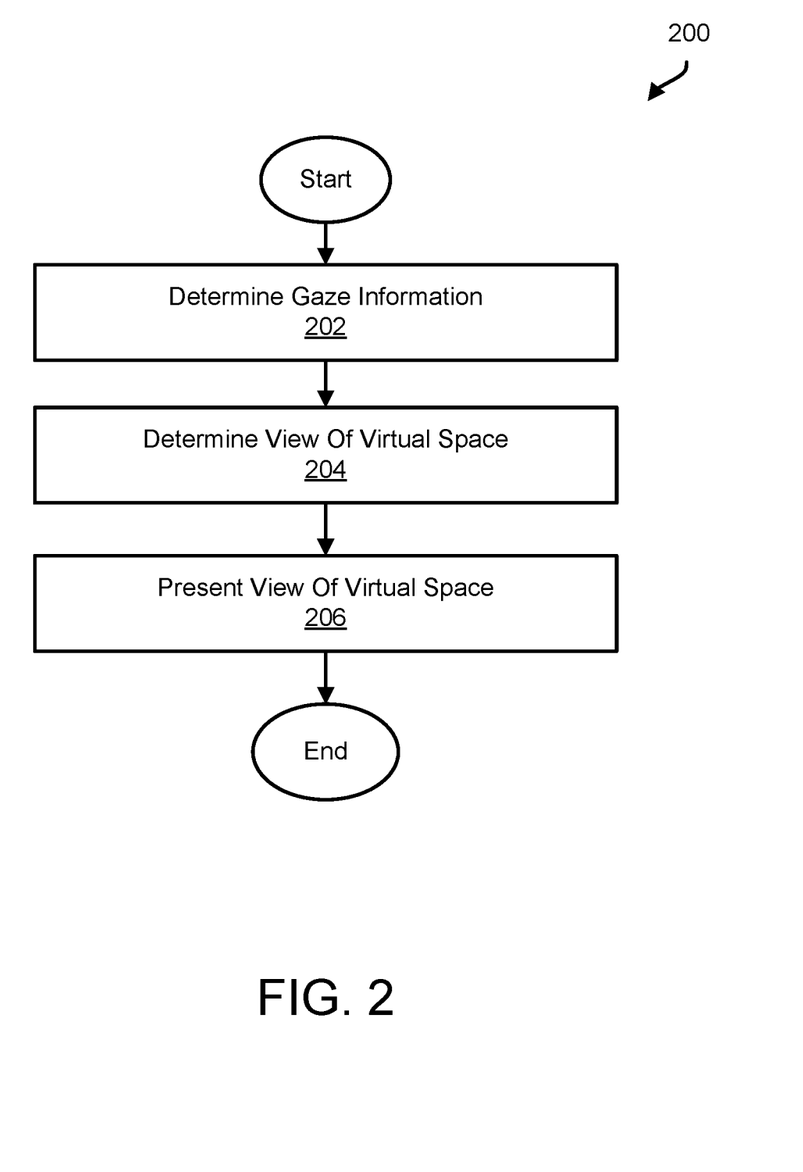
FIG. 2 illustrates a method to provide views of a virtual space, in accordance with one or more implementations.

FIG. 2 illustrates a method 200 to provide views of a virtual space, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in a computer system comprising one or more processing devices (e.g., a digital processor, an analog processor, a digital circuit designed to process information, an analog circuit designed to process information, a state machine, and/or other mechanisms for electronically processing information), storage media storing machine-readable instructions, one or more display devices, and/or other components. The one or more processing devices may include one or more devices executing some or all of the operations of method 200 in response to instructions stored electronically on electronic storage media. The one or more processing devices may include one or more devices configured through hardware, firmware, and/or software to be specifically designed for execution of one or more of the operations of method 200.

At an operation 202, gaze information may be determined. The gaze information may include one or more of a viewpoint, a gaze direction, a gaze position, and/or other information. In some implementations, operation 202 may be performed by one or more physical processors executing a gaze component the same as or similar to gaze component 110 (shown in FIG. 1 and described herein).

At an operation 204, an instance of a virtual space may be executed to determine a view of the virtual space. The view may be determined based on the gaze information and/or other information. In some implementations, operation 204 may be performed by one or more physical processors executing a space component the same as or similar to space component 112 (shown in FIG. 1 and described herein).

At an operation 206, presentation may be effectuated of the instance of the virtual space according to the determined view of the virtual space. The instance of the virtual space may be presented on a display screen of a display device. In some implementations, operation 206 may be performed by one or more physical processors executing an presentation component the same as or similar to presentation component 113 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to provide views of a virtual space, the system comprising:
   a display device including a display screen and one or more gaze sensors and one or more orientation sensors, the one or more gaze sensors being configured to generate output signals conveying gaze information, the gaze information including a viewpoint and a gaze direction of a user, the one or more orientation sensors being configured to generate output signals conveying orientation information, the orientation information including an orientation of the display device;

one or more physical processors configured by machine-readable instructions to:
    determine the gaze information from the output signals;
    execute an instance of a virtual space and determine a view of the virtual space based on the gaze information and the orientation information, the virtual space including a simulated space having a topography and one or more virtual objects positioned within the topography that are capable of locomotion within the topography, the view of the virtual space corresponding to a field of view within the virtual space, wherein the field of view is determined based on the orientation of the display device, the viewpoint, and the gaze direction of the user; and
    effectuate, via the display screen, presentation of the instance of the virtual space according to the view of the virtual space; and
wherein:
    the display device further includes a second set of one or more sensors, the second set of one or more sensors being configured to generate second output signals conveying image information, the image information defining visual content within a sensor field of view of the second set of one or more sensors; and
    the one or more physical processors are further configured by machine-readable instructions to:
        detect, based on the image information, presence of one or more users other than the user within the sensor field of view of the second set of one or more sensors;
        determine location of the one or more users present within the sensor field of view of the second set of one or more sensors; and
        effectuate, via the display screen, presentation of the one or more virtual objects within the topography of the virtual space, wherein individual virtual objects are presented to have individual perceived locations within the virtual space that correspond to individual locations of individual users of the one or more users, wherein the individual virtual objects represent the individual users within the virtual space as individual avatars of the individual users.

2. The system of claim 1, wherein the one or more sensors are disposed on a first side of the display device and the second set of one or more sensors are disposed on a second side of the display device, the second side being opposite the first side.

3. The system of claim 1, wherein the display device includes a mount securing the display device to a surface, wherein the mount is rotatable and extendable.

4. The system of claim 1, wherein changes in the field of view based on changes in the viewpoint and the gaze direction of the user cause the virtual space to exhibit the parallax effect with respect to the one or more virtual object positioned within the simulated space.

5. The system of claim 1, wherein the one or more physical processors are further configured by the machine-readable instructions to:
    detect presence of a physical object associated with the user, the physical object having non-transitory electronic storage storing information, the information facilitating identifying the user and/or the physical object;
    obtain experience information specific to the user, the experience information specifying products interacted with by the user; and
    customize the virtual space based on the experience information.

6. The system of claim 5, wherein the customization includes one or more of adding content to the virtual space, removing content from the virtual space, or modifying content within the virtual space.

7. The system of claim 6, wherein the customization is specific to the experience information such that the customization is representative of the products interacted with by the user.

8. The system of claim 1, wherein the viewpoint is specified as a position of the user's head and/or face relative the display device.

9. The system of claim 1, wherein the one or more physical processors are included in the display device.

10. A method to provide views of a virtual space on a display screen of a display device, the method comprising:
    determining gaze information including a viewpoint and a gaze direction of a user;
    obtain orientation information including an orientation of the display device;
    executing an instance of a virtual space and determining a view of the virtual space based on the gaze information and the orientation information, the virtual space including a simulated space having a topography and one or more virtual objects positioned within the topography that are capable of locomotion within the topography, the view of the virtual space corresponding to a field of view within the virtual space, wherein the field of view is determined based on the orientation of the display device, the viewpoint, and the gaze direction of the user;
    effectuating, via the display screen, presentation of the instance of the virtual space according to the view of the virtual space;
    obtaining image information, the image information defining visual content;
    detecting, based on the image information, presence of one or more users other than the user;
    determining location of the one or more users; and
    effectuating, via the display screen, presentation of the one or more virtual objects within the topography of the virtual space, wherein individual virtual objects are presented to have individual perceived locations within the virtual space that correspond to individual locations of individual users of the one or more users, wherein the individual virtual objects represent the individual users within the virtual space as individual avatars of the individual users.

11. The method of claim 10, wherein the display device includes one or more sensors disposed on a first side of the display device and a second set of one or more sensors disposed on a second side of the display device, the second side being opposite the first side.

12. The method of claim 10, further comprising mounting the display device to a surface using a mount, wherein the mount is rotatable and extendable.

13. The method of claim 10, wherein changes in the field of view based on changes in the viewpoint and the gaze direction of the user cause the virtual space to exhibit the parallax effect with respect to the one or more virtual objects positioned within the simulated space.

14. The method of claim 10, further comprising:
    detecting presence of a physical object associated with the user, the physical object having non-transitory electronic storage storing information, the information facilitating identifying the user and/or the physical object;
    obtaining experience information specific to the user, the experience information specifying products interacted with by the user; and
    customizing the virtual space based on the experience information.

15. The method of claim 14, wherein the customization is specific to the experience information such that the customization is representative of the products interacted with by the user.

16. The method of claim 10, wherein the viewpoint is specified as a position of the user's head and/or face relative the display device.

17. A display device comprising:
    one or more sensors, the one or more sensors being configured to generate output signals conveying gaze information, the gaze information including a viewpoint and a gaze direction of a user;
    one or more orientation sensors, the one or more orientation sensors being configured to generate second output signals conveying orientation information, the orientation information including an orientation of the display device;
    a display screen configured to present an instance of a virtual space according to a view of the virtual space, the virtual space including a simulated space having a topography and one or more virtual objects positioned within the topography that are capable of locomotion within the topography, the view of the virtual space corresponding to a field of view within the virtual space, wherein the field of view is determined based on the orientation of the display device, the viewpoint, and the gaze direction of the user;
    a second set of one or more sensors, the second set of one or more sensors being configured to generate third output signals conveying image information, the image information defining visual content within a sensor field of view of the second set of one or more sensors; and
    one or more physical processors configured by machine-readable instructions to:
        detect, based on the image information, presence of one or more users other than the user within the sensor field of view of the second set of one or more sensors;
        determine location of the one or more users present within the sensor field of view of the second set of one or more sensors; and
        effectuate, via the display screen, presentation of the one or more virtual objects within the topography of the virtual space, wherein individual virtual objects are presented to have individual perceived locations within the virtual space that correspond to individual locations of individual users of the one or more users, wherein the individual virtual objects represent the individual users within the virtual space as individual avatars of the individual users.

18. The display device of claim 17, further comprising:
    a mount fixing the display device at a base position and establishing a normal direction of the display device, wherein the mount is rotatable and extendable; and
    a first adjustment component facilitating rotation of the display screen relative to the base position to change the orientation of the display device, and a second adjustment component facilitating extension and retraction of the display screen relative to the base position to further change the orientation of the display device, wherein the field of view determined based on the orientation of the display device is based on a position of the display screen relative to the base position or a direction of the display screen relative to the established normal direction of the display device.

* * * * *

UNITED STATES PATENT AND TRADEMARK OFFICE
CERTIFICATE OF CORRECTION

PATENT NO. : 10,839,607 B2
APPLICATION NO. : 16/241791
DATED : November 17, 2020
INVENTOR(S) : Elliott Baumbach Page 1 of 1

It is certified that error appears in the above-identified patent and that said Letters Patent is hereby corrected as shown below:

In the Claims

In Claim 4, Column 15, Line 58, please delete "object" and insert --objects--, therefor.

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*